United States Patent
Christman

(10) Patent No.: US 7,784,734 B2
(45) Date of Patent: Aug. 31, 2010

(54) APPARATUS AND METHOD FOR RIGGING SLAVED AND ACTUATED PANELS WITH EXTERNAL ACCESS

(75) Inventor: David B. Christman, Ravensdale, WA (US)

(73) Assignee: The Boeing Company, Chicago, IL (US)

(*) Notice: Subject to any disclaimer, the term of this patent is extended or adjusted under 35 U.S.C. 154(b) by 957 days.

(21) Appl. No.: 11/553,665

(22) Filed: Oct. 27, 2006

(65) Prior Publication Data

US 2008/0099601 A1 May 1, 2008

(51) Int. Cl.
*B64C 25/10* (2006.01)
(52) U.S. Cl. .................. 244/102 R; 244/131; 403/7; 403/167; 52/127.7; 52/787.12
(58) Field of Classification Search ............. 244/102 R, 244/102 A, 129.5, 131, 132; 403/7, 167; 52/126.5, 126.7, 127.7, 127.12, 220.6, 787.12
See application file for complete search history.

(56) References Cited

U.S. PATENT DOCUMENTS

| | | | |
|---|---|---|---|
| 2,595,506 A * | 5/1952 | Backman | 52/127.12 |
| 2,945,653 A * | 7/1960 | Atkin | 244/119 |
| 2,978,079 A * | 4/1961 | Lowell | 52/127.12 |
| 3,092,097 A | 6/1963 | Moss | |
| 3,274,638 A | 9/1966 | Bien | |
| 4,456,206 A * | 6/1984 | Tijssen | 244/118.5 |
| 4,658,470 A | 4/1987 | Oen | |
| 5,175,665 A * | 12/1992 | Pegg | 361/218 |
| 5,222,694 A * | 6/1993 | Smoot | 244/119 |
| 5,269,481 A | 12/1993 | Derrien | |
| 6,024,330 A * | 2/2000 | Mroz et al. | 248/188.4 |
| 6,817,065 B1 | 11/2004 | Bruckner | |
| 6,834,834 B2 | 12/2004 | Dazet et al. | |

\* cited by examiner

*Primary Examiner*—Rob Swiatek
(74) *Attorney, Agent, or Firm*—Haynes and Boone, LLP.

(57) ABSTRACT

A rigging for moving an aircraft panel relative to an aircraft substructure includes a retaining base attached to a panel interior, and a slider rod held in contact with the substructure and adjustably engaged with the retaining base. The slider rod is manipulable from the panel exterior to adjustably engage the panel in a rigging position along a fair axis. The slider rod may include a tool appurtenance captively positioned within the riser bore that is exteriorly manipulable through a panel access port. Tool appurtenance manipulation may actuate the slider rod to adjustably engage the support hub and to move the panel into the fair position. A fit plate may be attached to the aircraft panel disposed intermediate to the retaining base, and may be adjustably attached to the aircraft panel for moving the aircraft panel into a fit position in a rigging plane.

12 Claims, 6 Drawing Sheets

APPARATUS AND METHOD FOR RIGGING SLAVED AND ACTUATED PANELS WITH EXTERNAL ACCESS

TECHNICAL FIELD

The present invention relates generally to aircraft and, more particularly, to aircraft panel rigging.

BACKGROUND

Conventional aircraft typically are constructed with retractable landing gear having a stowed position, in which the landing gear wheels are held in wells within the airplane structure to reduce aerodynamic drag during flight, and a deployed position, in which the landing gear wheels are extended to engage the ground surface during takeoff, landing, and ground operations. In addition, the fuselage of such conventional aircraft are constructed with landing gear doors that can cover the stowed landing gear during flight, and cover the landing gear wells while the aircraft is on the ground. To reduce structural stress, fuel consumption, and noise during flight, and to facilitate gear well protection and maintenance while the aircraft is on the ground, it is desirable to dispose and maintain a landing gear door in a proper position, for example, with respect to the surface of an aircraft fuselage, of another landing gear door, or of the landing gear. Frequently, positioning may be made relative to multiple reference surfaces.

To achieve proper mating of the exterior surface of a landing gear door relative to adjacent exterior surfaces of the aircraft within specified tolerances, present initial factory installation and subsequent field maintenance procedures call for full landing gear cycling, that is actuating the landing gear between a stowed position and a fully-deployed position. During cycling, factory or maintenance personnel typically take measurements and provide adjustments to the landing gear door connections to meet an "as designed" positioning specification.

In the case of a main landing gear door, the main landing gear may be fully cycled several times, with the obtained measurements being used subsequently, such as to adjust a tie-rod that may attach the landing gear door to the aircraft at particular locations, or a washer/shim stack-up at another location. Often, after deployed measurements, the pin, washer, and nut installations associated with a particular aircraft attachment point are removed, recalculated, and re-installed; with the landing gear door fit and fair measurements again being taken after the landing gear is actuated to the stowed position. If necessary, these fit and fair measurements are used to make additional iterative adjustments to tie-rods, pins, washers, and nuts, until an acceptable "as designed" fit and fair is achieved. Understandably, such adjustment can be both time consuming and costly.

As a result, there is a need for an apparatus and method by which "as designed" fit and fair positioning can be achieved for aircraft landing gear doors without cycling the landing gear, for example, by allowing adjustment to the landing gear door while the landing gear is stowed.

SUMMARY

Systems and methods are disclosed herein provide a rigging, a method for rigging, and a means for rigging, which may be used to bring a panel, which may have an access port, into a rigging position relative to a substructure along a rigging axis. In general, the rigging may be disposed in proximity to an interior aspect of the panel and may be accessible from an exterior aspect of the panel through a panel access port. A rigging position may be a fit position, a fair position, or a combination thereof. The rigging axis may be a fit axis, a fair axis, or a combination thereof. A fit axis may be defined relative to a rigging plane having first and second rigging axes, and the first rigging axis may be perpendicular to a second rigging axis. Also, the fair axis may be perpendicular to the rigging plane.

In accordance with one embodiment according to the present invention, a rigging may include a retaining base, and a slider rod engaged with retaining base. The retaining base may include a support hub and a hollow riser extending along the fair axis from the support hub and communicating between the support hub and the access port. The slider rod may be configured with a tool appurtenance, a midshank, and a contact element. The midshank may adjustably engage the support hub, with the tool appurtenance being captively positioned within the riser bore and accessible by the access port. The retaining base may be attached to the panel; and the contact element may be configured to be held in contact with the substructure. The contact element may be held in releasable contact or in secured contact, which may include fixed secured contact or adjustable secured contact. In certain embodiments, the retaining base may include a fit plate configured to adjustably engage the retaining base within a preselected rigging plane relative to the panel. A tool, introduced through the access port, may be used to manipulate the tool appurtenance, causing the slider rod to adjustably engage the retaining base, such that the panel may be moved along the fair axis to a preselected fair position relative to the substructure. A fit plate may be attached to the panel intermediate to the retaining base, and may be configured to adjustably engage the retaining base, such that the panel is moved to a preselected fit position within the preselected rigging plane. An exemplary panel may be an aircraft landing gear door panel and an exemplary substructure may be, without limitation, an aircraft landing gear assembly, and an aircraft main landing gear.

In accordance with another embodiment of the present invention, a method for positioning an aircraft panel relative to an aircraft substructure may include engaging a rigging slider rod that is in contact with the aircraft substructure, and adjustably engaging the rigging slider rod with a retaining base such that the aircraft panel is moved along a rigging axis to a preselected rigging position relative to the aircraft substructure. The rigging slider rod may be adjustably engaged by manipulating the slider rod from the panel exterior though a panel access port. The rigging slider rod may have a tool appurtenance that is manipulable by a tool introduced through the panel access port. Selected method embodiments may include holding the rigging slider rod in contact with the aircraft substructure, which contact may be releasable contact or secured contact. Holding the rigging slider rod in secured contact may include, without limitation, holding the rigging slider rod in adjustable secured contact or holding the rigging slider rod in fixed secured contact. Adjustably engaging the retaining base may include moving the panel into a preselected fair position along a preselected fair axis. Certain method embodiments may include adjustably engaging the retaining base relative to the panel, such that the panel is moved to a preselected fit position within a preselected rigging plane.

According to yet another exemplary embodiment of the present invention, a means for rigging a panel to a substructure may include means for connecting with the substructure, means for attaching to the panel, and means for adjustably engaging the connecting means with the attaching means so that the panel is moved into a preselected rigging position along a preselected rigging axis relative to the substructure. The preselected rigging axis may be a preselected fair axis and the preselected rigging position may be a preselected fair position. The rigging means also may include means for manipulating the rigging position by actuating the adjustably engaging means. The means for manipulating may be accessible from the exterior of the panel. In selected means embodiments, the connecting means may further include means for holding the connecting means in contact with the substructure. In selected embodiments, the means for holding may be a means for holding in releasable contact or a means for holding in secured contact. Further, the means for holding in secured contact may be a means for holding in fixed secured contact or a means for holding in adjustable secured contact.

Selected exemplary embodiments may permit a mechanic to adjust an aircraft landing gear door from the outside of an aircraft, while the door is disposed in a closed state, and may reduce the amount of time needed to adjust aircraft landing gear doors, as may occur during factory installation and, afterwards, during aircraft maintenance.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
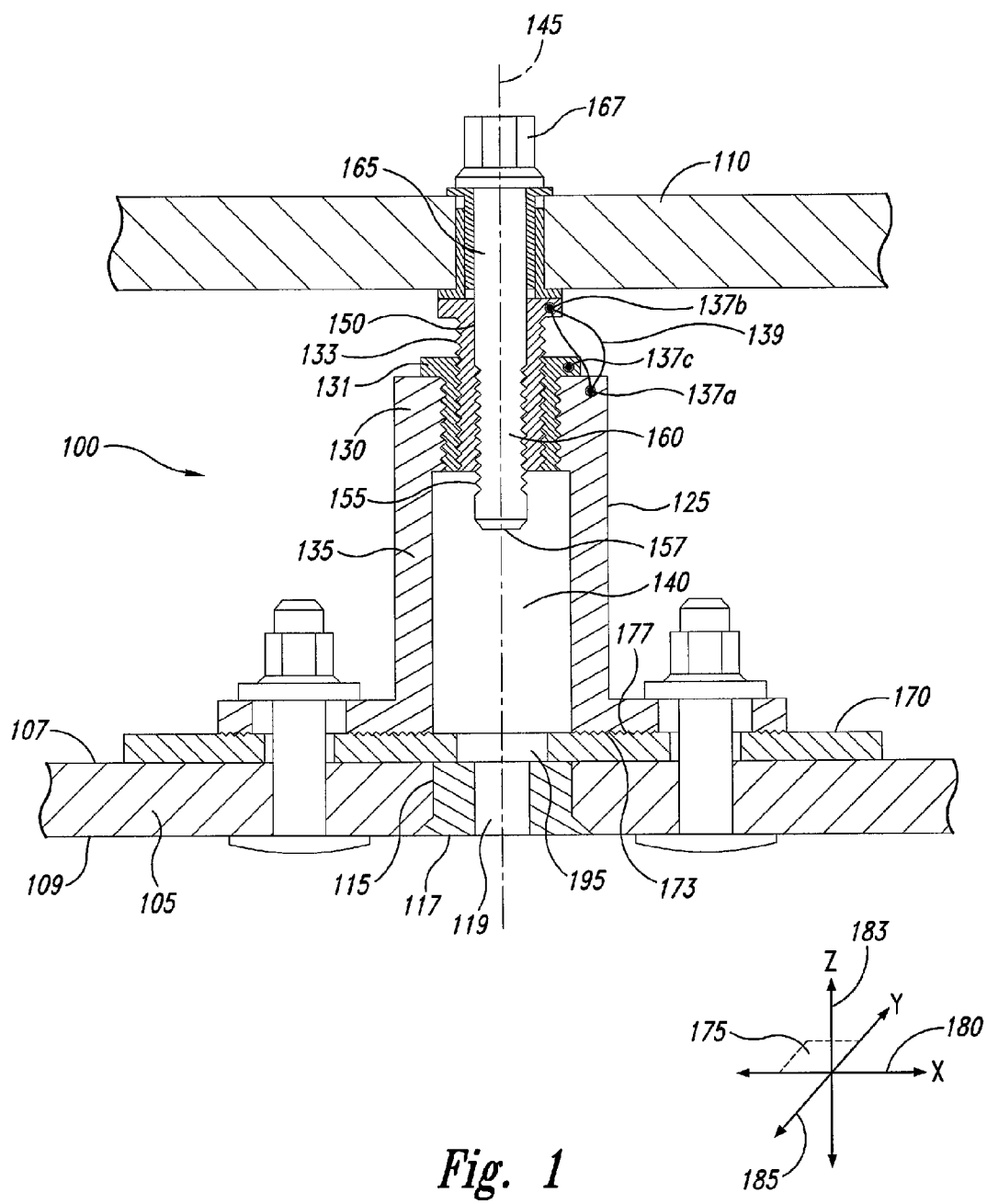
FIG. 1 shows a cross-sectional side view illustration of a rigging in accordance with an embodiment of the present invention.

In general, the embodiments herein may be used to facilitate rigging slaved and actuated aircraft panels by way of external access. Within the foregoing context, FIG. 1 illustrates exemplary rigging 100, which may be used with an aircraft main landing gear (MLG) to bring an aircraft panel, MLG door panel 105, into a rigging position relative to an aircraft substructure, such as MLG strut assembly 110. Panel access port 115 may be disposed to permit access to rigging 100 from MLG door panel exterior 109. The rigging position may be a preselected fair position disposed along fair axis 145 (e.g., z-axis 183). The retaining base may be in the form of pedestal 125, having hollow riser 135 and support hub 130. Riser bore 140 may extend from support hub 130 along fair axis 145 and may communicate between support hub 130 and MLG door access port 115. Slider rod 150 may be provided in the form of a bolt having a tool appurtenance 155, threaded midshank 160, and contact element 165. Midshank 160 may adjustably engage support hub 130 along fair axis 145, with tool appurtenance 155 being captively positioned within riser bore 140 and accessible by panel access port 115.

Pedestal 125 may be attached to MLG door panel interior 107, and contact element 165 may be held in secured contact with MLG strut assembly 110. One non-limiting example of contact element 165 may include configurations in which contact head 167 captures a portion of MLG strut assembly 110 on a portion of slider rod 150. However, other configurations of contact element 165 may be held in secured contact with a substructure, including, without limitation, an annular element such as an "eye," pivot joint, or hinge knuckle, such as is described with respect to FIG. 3 or to FIG. 5. Tool appurtenance 155 may be manipulable by a tool (not shown) introduced from MLG door panel exterior 109 through panel access port 115. By manipulating tool appurtenance 155, slider rod 150 may be actuated to adjustably engage pedestal 125, such that MLG panel door 105 may be moved along fair axis 145 to a preselected fair position relative to MLG strut assembly 110. Although not limited thereto, tool appurtenance 155 may be provided with tool recess 157, for example, in the form of a hex recess capable of being engaged by a tool having a mating hex tip, such as an Allen wrench. Tool appurtenance 155 may be configured to include, without limitation, a formed end such as an external hex head, a tool tang, or slotted screwdriver end. In addition, such a tool appurtenance may be machined into a keyed, torque-limiting, self-seating, or self-centering configuration.

Bushing 131 may be coaxially fitted in support hub 130 to enhance load-bearing capabilities of pedestal 125, and may be provided with internal and external threads. In embodiments in which bushing 131 has external threads, support hub 130 may be disposed with mating internal threads. In some alternative embodiments, it may be desirable to couple bushing 131 to pedestal 125 using a reverse-threading arrangement, which may reduce threading back out, while slider rod 150 is under load. In other alternative embodiments, bushing 131 may be a press-fit bushing. It may be advantageous to configure pedestal 125 to constrain slider rod 150 in locked engagement once the preselected fair position is achieved, thereby securely maintaining the selected fair position. Thus, support hub 130 may be provided with locking element 133 to hold slider rod 150 in locked engagement with support hub 130, for example, after MLG door panel 105 is brought into the selected fair position. Locking element 133 may be, without limitation, a locking nut. In addition, rigging 100 may have one or more retention fittings 137a-c to retain slider rod 150 in the preselected fair position. For example, retention fittings 137a-c may be apertures through which lock wire 139 may secure retention fitting 137a to retention fitting 137b generally inhibiting movement of locking element 133 relative to pedestal 125. Retention fittings 137a-c may be used to provide secure retention on an impermanent basis, such as during the course of an iterative rigging adjustment.

Also in accordance with the present invention, fit plate 170 may be configured to adjustably attach pedestal 125 to MLG door panel 105 along a first preselected rigging plane axis 180

(e.g., x-axis) within a preselected rigging plane 175. Fit plate 170 may be attached to MLG door panel 105 intermediate to pedestal 125, and be configured to adjustably attach pedestal 125, such that MLG door panel 105 may be moved into a preselected fit position in rigging plane 175 relative to MLG strut assembly 110. In selected embodiments, fit plate 170 may be configured with fitting engagement surface 173, which may adjustably mate with retaining base engagement surface 177. Surfaces 173, 177 may be mating surfaces including, without limitation, serrated, slotted, or keyed surfaces. Also, fit plate 170 may be configured to adjustably attach pedestal 125 in a second rigging plane axis 185 (e.g., y-axis), or in an axis of rigging plane 175 representing a combination of axis 180 and axis 185. Fit plate 170 may be formed with access aperture 195 configured to allow access to tool appurtenance 155 through access port 115 from MLG door panel exterior 109.

Additionally, access port plug 117 may be provided to close panel access port 115 from MLG door panel exterior 109, for example, to inhibit the introduction, or accumulation, of undesirable material, such moisture or debris, to MLG door panel interior 107. Access port plug 117 may be made of a resilient material capable of providing a suitably functional seal including, without limitation, a nylon plug, or a silicone plug. Conveniently, access port plug 117 may be disposed with a driving end having a formed end similar in shape to tool appurtenance 155; and may include a small through-hole 119 sized to be small enough to inhibit the introduction of undesirable matter through access port 115, yet be large enough to inhibit accumulation of fluids behind panel 105, for example, in riser bore 140.

Although rigging 100 is illustrative of some embodiments in which a contact element, e.g., contact element 165, is held in secured contact with a substructure, e.g., MLG strut assembly 110, other embodiments of rigging embodiments are not so restricted, and a contact element may be in releasable contact with a substructure.

Figure 2:
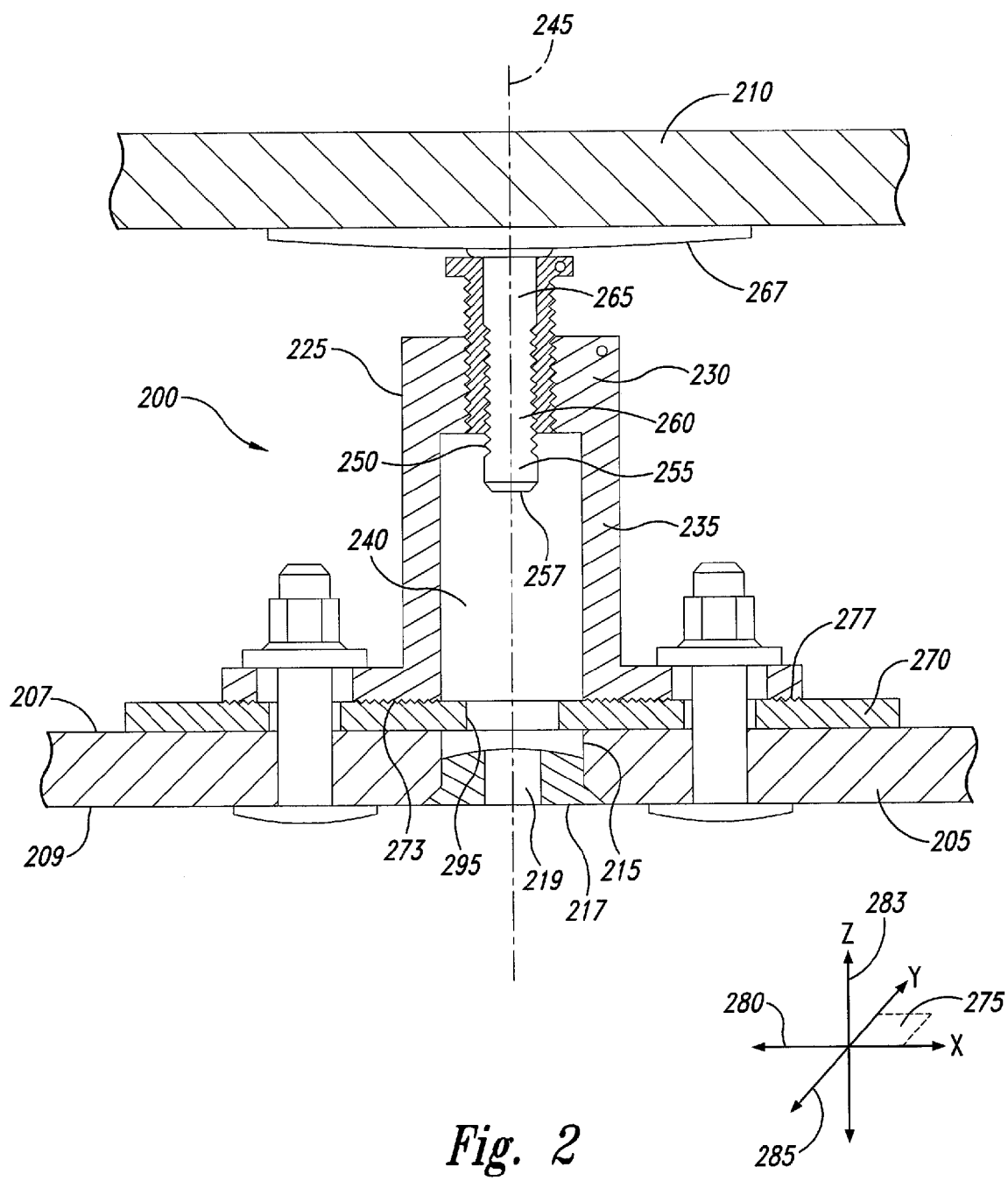
FIG. 2 shows a cross-sectional side view illustration of a rigging in accordance with another embodiment of the present invention.

Accordingly, FIG. 2 shows another exemplary embodiment of the present invention in which rigging 200 may held in releasable contact with substructure 210. Rigging 200 may be used to move aircraft panel assembly 205 into a preselected rigging position relative to aircraft auxiliary door assembly 210. Aircraft panel assembly 205 may be configured with panel assembly access port 215 allowing access from panel exterior 209 to panel interior 207. Similar to rigging 100 in FIG. 1, rigging 200 may include a retaining base in the form of pedestal 225, having hollow riser 235 and support hub 230. Riser bore 240 may extend along fair axis 245 from support hub 230, and may communicate between support hub 230 and panel assembly access port 215. Pedestal 225 may be attached to aircraft panel assembly 205. Slider rod 250 may be provided in the form of a bolt having a tool appurtenance 255, threaded midshank 260, and contact element 265. Midshank 260 may adjustably engage support hub 230 along fair axis 245, with tool appurtenance 255 being captively positioned within riser bore 240 and exteriorly accessible through access port 215. Unlike rigging 100, which may be held in secured contact with substructure 110, for example, using bolt head 167, contact element 265 of rigging 200 may be configured to be held in releasable contact with aircraft auxiliary door assembly 210, for example, using support head 267. Although not a requirement, support head 267 may be a self-adjusting head capable of providing supporting contact with aircraft auxiliary door assembly 210, while accommodating acceptable off-axis misalignments which may occur. Support head 267 also may be provided with a resilient surface. By manipulating tool appurtenance 255 with a tool (not shown) introduced from panel exterior 209 through panel access port 215, slider rod 250 may be actuated to adjustably engage pedestal 225, such that aircraft panel assembly 205 may be moved along fair axis 245 (e.g., z-axis 283) to a preselected fair position relative to aircraft auxiliary door assembly 210. Conveniently, tool appurtenance 255 may be provided with a tool recess 257, for example, in the form of a hex recess capable of being engaged by a tool having a mating hex tip, such as an Allen wrench. Tool appurtenance 255 also may be configured in a manner similar to tool appurtenance 155 in FIG. 1.

Also in accordance with the present invention, rigging 200 may include fit plate 270 configured to attach to aircraft panel interior 207 within a preselected rigging plane 275 along a first preselected rigging plane axis 280 (e.g., x-axis). Fit plate 270 may adjustably attach to pedestal 225 intermediate to aircraft panel assembly 205, such that aircraft panel assembly 205 may be moved into a preselected fit position, relative to aircraft auxiliary door assembly 210. In selected embodiments, fit plate 270 may be configured with fitting engagement surface 273, which may adjustably mate with retaining base engagement surface 277. Surfaces 273, 277 may be mating surfaces including, without limitation, serrated, slotted, or keyed surfaces. Also, fit plate 270 may be configured to adjustably attach pedestal 225 in a second rigging plane axis 285 (e.g., y-axis), or in an axis of rigging plane 275 representing a combination of axis 280 and axis 285. Fit plate 270 may be formed with access aperture 295 configured to allow exterior access to tool appurtenance 255 through panel access port 215. Additionally, access port plug 217 may be configured to close panel access port 215 from panel exterior 209, for example, to inhibit the introduction, or accumulation, of undesirable material, such moisture or debris, into panel interior 207. Conveniently, access port plug 217 may be disposed with a driving end having a formed end similar in shape to tool appurtenance 255; and may include a small through-hole 219 sized to be small enough to inhibit the introduction of undesirable matter through panel access port 215, yet be large enough to inhibit accumulation of fluids behind aircraft panel assembly 205. Access port plug 217 may be made of a resilient material capable of providing a suitably functional seal including, without limitation, a nylon plug, or a silicone plug.

Although rigging 100 in FIG. 1 and rigging 200 in FIG. 2 are illustrated to have respective retaining bases provided in a pedestal-like form, other embodiments of the present invention are not so limited.

Figure 3:
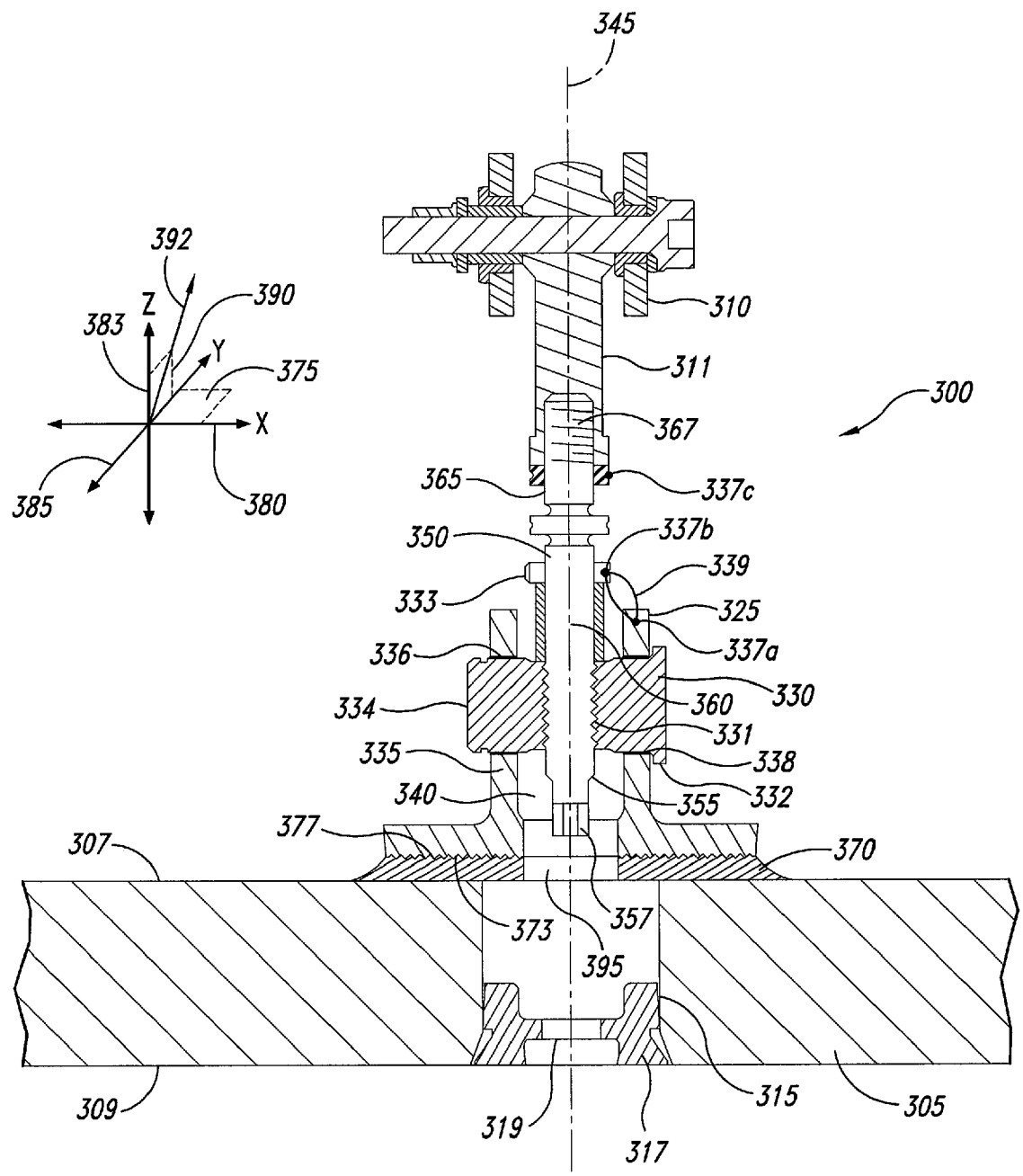
FIG. 3 shows a cross-sectional side view illustration of a rigging in accordance with yet another embodiment of the present invention.

FIG. 3 shows exemplary rigging 300 having a securing contact element, which may be used to hold rigging 300 in secured contact with substructure 310. Rigging 300 also may be attached to panel 305. Panel 305 may be configured with panel access port 315 formed between panel exterior 309 and panel interior 307. Similar to rigging 100 in FIG. 1, and rigging 200 in FIG. 2, rigging 300 may include retaining base 325 and slider rod 350. Retaining base 325 may include support footing 335 and support hub 330. Support hub 330 may be formed with axial bore 331. Support footing 335 can be formed with a detention cavity 340, which may be sized to retain support hub 330 therein, and may be shaped to retain support hub 330 such that axial bore 331 is oriented in alignment with fair axis 345. Fair axis 345 may be oriented along z-axis 383 of rigging plane 390, or may be oriented along axis 392 within rigging plane 375 or rigging plane 390, or both. Support hub 330 also may be configured with retention portions 332-334, which may at least partially extend through, and be received by, captive slots 336-338 in footing 335. A non-limiting example of support hub 330 may be a barrel nut. Slider rod 350 may be provided in the form of a shaft having a tool appurtenance 355, midshank 360, and contact element 365. Midshank 360 may engage support hub 330 along axial bore 331 with tool appurtenance 355 being captively positioned within detention cavity 340. By manipulating tool appurtenance 355 with a tool (not shown) introduced through panel access port 315 from the exterior of panel 305, slider rod 350 may be actuated to adjustably engage retaining base 325, moving panel 305 along rigging axis 392 to a preselected rigging position relative to substructure 310. Tool appurtenance 355 may be disposed, for example, in the form of shaped tool tang 357 configured to be engaged by a tool having a mating recess. Also, tool appurtenance 355 may be configured in a manner similar to tool appurtenance 155 and 255, in FIGS. 1 and 2, respectively.

Conveniently, support hub 330 and slider rod 350 may be matingly configured to facilitate the movement of substructure 310, relative to retaining base 325. In one non-limiting example, support hub 330 may be a barrel nut, having internal threads disposed along axial bore 331; and slider rod 350 may have external mating threads disposed on midshank 360. In addition, contact element 365 may be a fixed securing element 367, such as an integral bolt "eye," pivot joint, or hinge knuckle. In such exemplary embodiments, by manipulating tool appurtenance 355, externally-threaded midshank 360 adjustably engages with mating threads in axial bore 331 of barrel nut 330, causing slider rod 350 to move relative to retaining base 325, such that fixed securing element 367 may be moved along rigging axis 392 and, in turn, panel 305 may be moved to a preselected rigging position relative to substructure 310. In another non-limiting example, support hub 330 also may be a barrel nut having an unthreaded axial bore, with midshank 360 on slider rod 350 also being unthreaded, with slider rod being adapted such that tool appurtenance 355 may be captively positioned within detention cavity 340. In addition, contact element 365 may be an adjustable securing element 367. Element 367 may be a shaft end having external threads configured to adjustably engage with adjustment member 311 of substructure 310. Adjustment member 311 may be, without limitation, an adjustable hinge knuckle, or a pivot joint, of an adjustable substructure support. In such exemplary embodiments, by manipulating tool appurtenance 355, externally-threaded adjustable securing element 367 adjustably engages with mating threads in adjustment member 311, causing slider rod 350 to move relative to retaining base 325, such that adjustment member 311 may be moved along fair axis 345 and, in turn, panel 305 may be moved to a preselected rigging position relative to substructure 310. Adjustment member 311 also may be a constituent member of slider rod 350, formed to pivotably link with the adjustable hinge of substructure 310.

It may be advantageous to configure retaining base 325 to constrain slider rod 350 in locked engagement once the preselected rigging position is achieved, thereby securely maintaining the preselected rigging position. Thus, support footing 335 may be provided with locking element 333 to hold slider rod 350 in locked engagement with retaining base 325, for example, after panel 105 is brought into the preselected rigging position relative to substructure 310. Locking element 333 may be, without limitation, a locking nut. In addition, rigging 300 may have one or more retention fittings 337a-c to retain slider rod 350 in the preselected rigging position. For example, retention fittings 337a-c may be apertures through which lock wire 339 may secure retention fitting 337a, in retaining base 325, to fitting 337b inhibiting movement of locking element 333. Retention fittings 337a-c may be used to provide secure retention on an impermanent basis, such as during the course of an iterative rigging adjustment.

Fit plate 370 may be attached to panel 305 intermediate to retaining base 325 along a first rigging plane axis 380 (e.g., x-axis). Fit plate 370 may be configured to adjustably attach to retaining base 325, such that panel 305 may be moved relative to substructure 310 into a preselected fit position in preselected rigging plane 375. In selected embodiments, fit plate 370 may be configured with engagement surface 373, which may adjustably mate with retaining base engagement surface 377. Surfaces 373, 377 may be mating surfaces including, without limitation, serrated, slotted, or keyed surfaces. Also, fit plate 370 may be configured to adjustably attach pedestal 325 in a second rigging plane axis 385 (e.g., y-axis), or in an axis of rigging plane 375 representing a combination of axis 380 and axis 385. Fit plate 370 may be formed with access aperture 395 configured to allow access to tool appurtenance 355 through access port 315. Additionally, access port plug 317 may be configured to close access port 315 from the exterior of MLG door panel 305, for example, to inhibit the introduction, or accumulation, of undesirable material, such moisture or debris. Conveniently, access port plug 317 may be disposed with a driving end having a formed end similar in shape to tool appurtenance 355; and may include a small through-hole 319 sized to be small enough to inhibit the introduction of undesirable matter through panel access port 315, yet be large enough to inhibit accumulation of fluids behind MLG door panel 305. Access port plug 317 may be made of a resilient material capable of providing a suitably functional seal including, without limitation, a nylon plug or a silicone plug.

Figure 4:
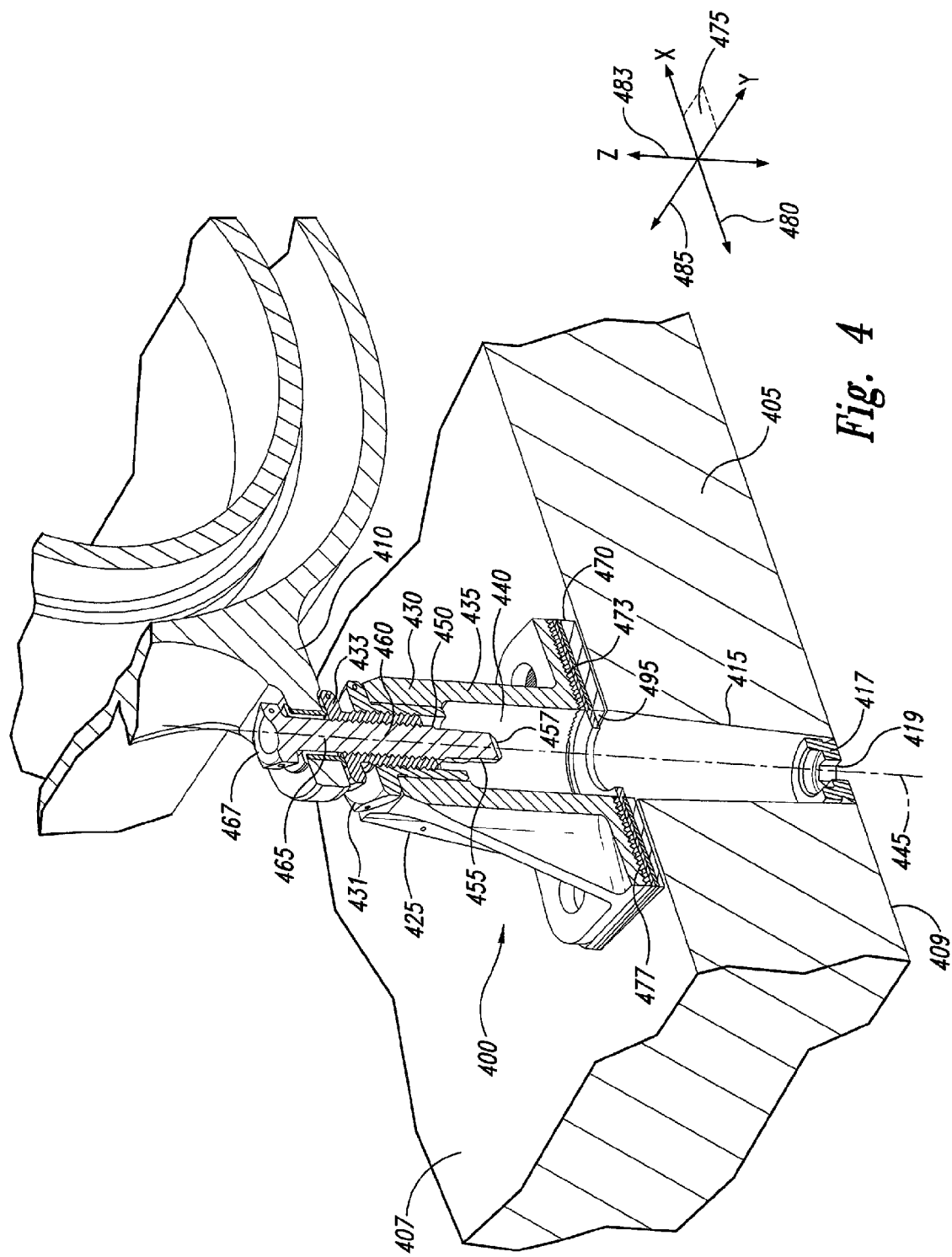
FIG. 4 shows a cross-sectional perspective view illustration of the rigging of FIG. 1 in the context of a main landing gear application.

FIG. 4 illustrates one embodiment of rigging 400, similar to rigging 100 in FIG. 1, which may be used to bring MLG door panel 405 into a rigging position relative to MLG strut assembly 410. MLG door panel access port 415 may be disposed between panel exterior 409 and panel interior 407. Rigging 400 may include pedestal 425, having hollow riser 435 and support hub 430. Riser bore 440 may extend from support hub 430 along preselected fair axis 445, and may communicate between support hub 430 and MLG door panel access port 415. Preselected fair axis 445 may correspond, for example, to z-axis 483. Slider rod 450 may be provided in the form of a bolt having a tool appurtenance 455, threaded midshank 460, and contact element 465. Midshank 460 may adjustably engage support hub 430 along fair axis 445, with tool appurtenance 455 being captively positioned within riser bore 440 and exteriorly accessible through panel access port 415. Pedestal 425 may be attached to MLG door panel 405, and contact element 465 may hold MLG strut assembly 410 in secured contact. Bushing 431 may be coaxially fitted in support hub 430 to enhance load-bearing capabilities of pedestal 425, and may be provided with internal and external threads. In embodiments in which bushing 431 has external threads, support hub 430 may be disposed with mating internal threads. In some alternative embodiments, it may be desirable to couple bushing 431 to pedestal 425 using a reverse-threading arrangement, which may reduce threading back out, while slider rod 450 is under load. In other alternative embodiments, bushing 431 may be a press-fit bushing. It may be advantageous to configure pedestal 425 to constrain slider rod 450 in locked engagement once the preselected fair position is achieved, thereby securely maintaining the preselected fair position. Thus, support hub 430 may be provided with locking element 433 to hold slider rod 450 in locked engagement with support hub 430, for example, after MLG door panel 405 is brought into the preselected fair position relative to MLG strut assembly 410. Locking element 433 may be, without limitation, a locking nut. By manipulating tool appurtenance 455, for example, using a tool (not shown) introduced from panel exterior 409 through access port 415, slider rod 450 may be actuated to adjustably engage pedestal 425. By so actuating slider rod 450, MLG panel door 405 may be moved along preselected fair axis 445 to a preselected fair position relative to MLG strut assembly 410. Tool appurtenance 455 may be configured in a manner similar to tool appurtenance 155, 255, and 355, in FIGS. 1, 2, and 3, respectively.

In addition, fit plate 470 may be configured to attach to MLG door panel 405 along a first preselected rigging plane axis 480 (e.g., x-axis) within preselected rigging plane 475. Fit plate 470 may be configured to adjustably attach to pedestal 425 intermediate to MLG door panel 405, such that MLG door panel 405 be moved relative to MLG strut assembly 410 into a preselected fit position in rigging plane 475. In selected embodiments, fit plate 470 may be configured with engagement surface 473, which may adjustably mate with retaining base engagement surface 477. Surfaces 473, 477 may be mating surfaces including, without limitation, serrated, slotted, or keyed surfaces. Also, fit plate 470 may be configured to adjustably attach pedestal 425 in a second rigging plane axis 485 (e.g., y-axis), or in an axis of rigging plane 475 representing a combination of axis 480 and axis 485. Fit plate 470 may be formed with access aperture 495 configured to allow exterior access to tool appurtenance 455 through panel access port 415. Additionally, panel access port plug 417 may be provided and configured to close access port 415, and may be made of a resilient material capable of providing a suitably functional seal including, without limitation, a nylon plug or a silicone plug. Access port plug 417 may be disposed with a driving end, formed with a small through-hole 419, similar to plugs 117, 217, and 317 in FIGS. 1, 2, and 3, respectively.

Figure 5:
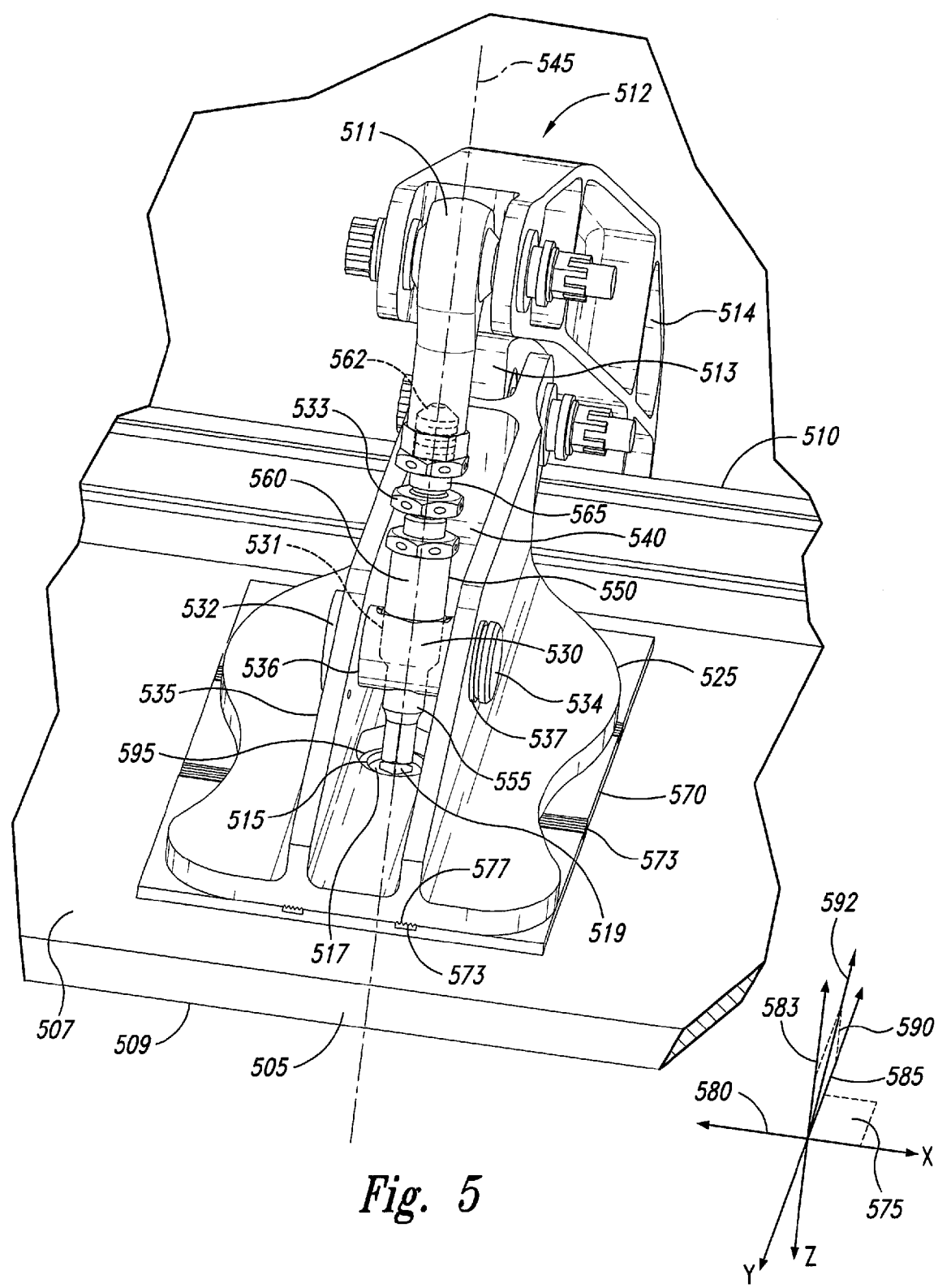
FIG. 5 shows a perspective view illustration of the rigging of FIG. 3 in the context of an adjustable hinge for a landing gear door application.

FIG. 5 illustrates exemplary rigging 500, which may be similar to rigging 300, and which may have a securing contact element used to hold rigging 500 in secured contact with auxiliary strut door assembly 510. Rigging 500 may be attached interiorly to strut door panel 505. Strut door panel 505 may include panel access port 515, formed between panel exterior 509 and panel interior 507. Rigging 500 may be configured with retaining base 525 and slider rod 550. Retaining base 525 may include support footing 535 and support hub 530. Support hub 530 may be formed with axial bore 531. Support footing 535 can be formed with a detention cavity 540, which may be sized to retain support hub 530 therein, and may be shaped to retain support hub 530 such that axial bore 531 is oriented in alignment with preselected fair axis 545. Preselected fair axis 545 may be oriented in alignment, for example, with rigging axis 592 of rigging plane 590. Support hub 530 also may be configured with retention portions 532-534, which may at least partially extend through, and be received by, captive slots 536-337 in footing 535. A non-limiting example of support hub 530 may be an internally-threaded barrel nut. Slider rod 550 may be provided in the form of a shaft having a tool appurtenance 555, midshank 560, and contact element 565. Midshank 560 may be threaded to engage support hub 530 along axial bore 531 with tool appurtenance 555 being captively positioned within detention cavity 540. In general, a tool (not shown) introduced from panel exterior 509 through access port 515 may be used to manipulate tool appurtenance 555, and to actuate slider rod 550 to move relative to retaining base 525, such that strut door panel 505 may be moved along rigging axis 591 to a preselected rigging position relative to auxiliary strut door assembly 510.

Support hub 530 also may be a barrel nut, having an unthreaded axial bore 531. Midshank 560 also may be unthreaded. In addition, contact element 565 may include adjustable securing element 567 having a shaft end with external threads configured to adjustably contact with adjustment knuckle 511 of adjustable hinge, generally at 512. Adjustment knuckle 511 may be affixed to auxiliary strut door assembly 510 by pivot arm 514. Adjustable hinge 512 also may include fixed knuckle 513, which also may be affixed to auxiliary strut door assembly 510. Accordingly, by manipulating tool appurtenance 555, externally-threaded adjustable securing element 567 may adjustably engage with mating threads in adjustment knuckle 511, causing adjustment knuckle 511 to move relative to retaining base 525 along rigging axis 592, in turn, adjusting the position of strut door panel 505, relative to auxiliary strut door assembly 510.

Similar to rigging 100 in FIG. 1 and rigging 300 in FIG. 3, it may be advantageous to configure retaining base 525 to constrain slider rod 550 in locked engagement, once the preselected rigging position is achieved, thereby securely maintaining the preselected rigging position. Thus, contact end 565 also may be provided with locking element 533 to hold slider rod 550 in locked engagement with retaining base 525, for example, after door panel 505 is brought into the preselected rigging position relative to substructure 510. Locking element 533 may be, without limitation, a locking nut. Fit plate 570 may be configured to attach to strut door panel 505 along first preselected rigging plane axis 580 (e.g., x-axis) within preselected rigging plane 575. Fit plate 570 may be adjustably attached to retaining base 525 intermediate to strut door panel 505, such that strut door panel 505 may be moved relative to auxiliary strut door assembly 510 into a preselected fit position in preselected rigging plane 575. In selected embodiments, fit plate 570 may be configured with engagement surface 573, which may adjustably mate with retaining base engagement surface 577. Surfaces 573, 577 may be mating surfaces including, without limitation, serrated, slotted, or keyed surfaces. Also, fit plate 570 may be configured to adjustably engage pedestal 525 in a second rigging plane axis 585 (e.g., y-axis), or in an axis of rigging plane 575 representing a combination of axis 580 and axis 585. Fit plate 570 may be formed with access aperture 595 configured to allow exterior access to tool appurtenance 555 through panel access port 515 from strut door panel 505. Additionally, access port plug 517 may be configured to close panel access port 515 from communication with strut door panel exterior 509, for example, to inhibit the introduction, or accumulation, of undesirable material, such moisture or debris. Access port plug 517 may be disposed with a driving end and may include a small through-hole (not shown), similar to plugs 117, 217, 317, and 417 in FIGS. 1, 2, 3, and 4, respectively. Access port plug 517 may be made of a resilient material capable of providing a suitably functional seal including, without limitation, a nylon plug or a silicone plug.

Figure 6:
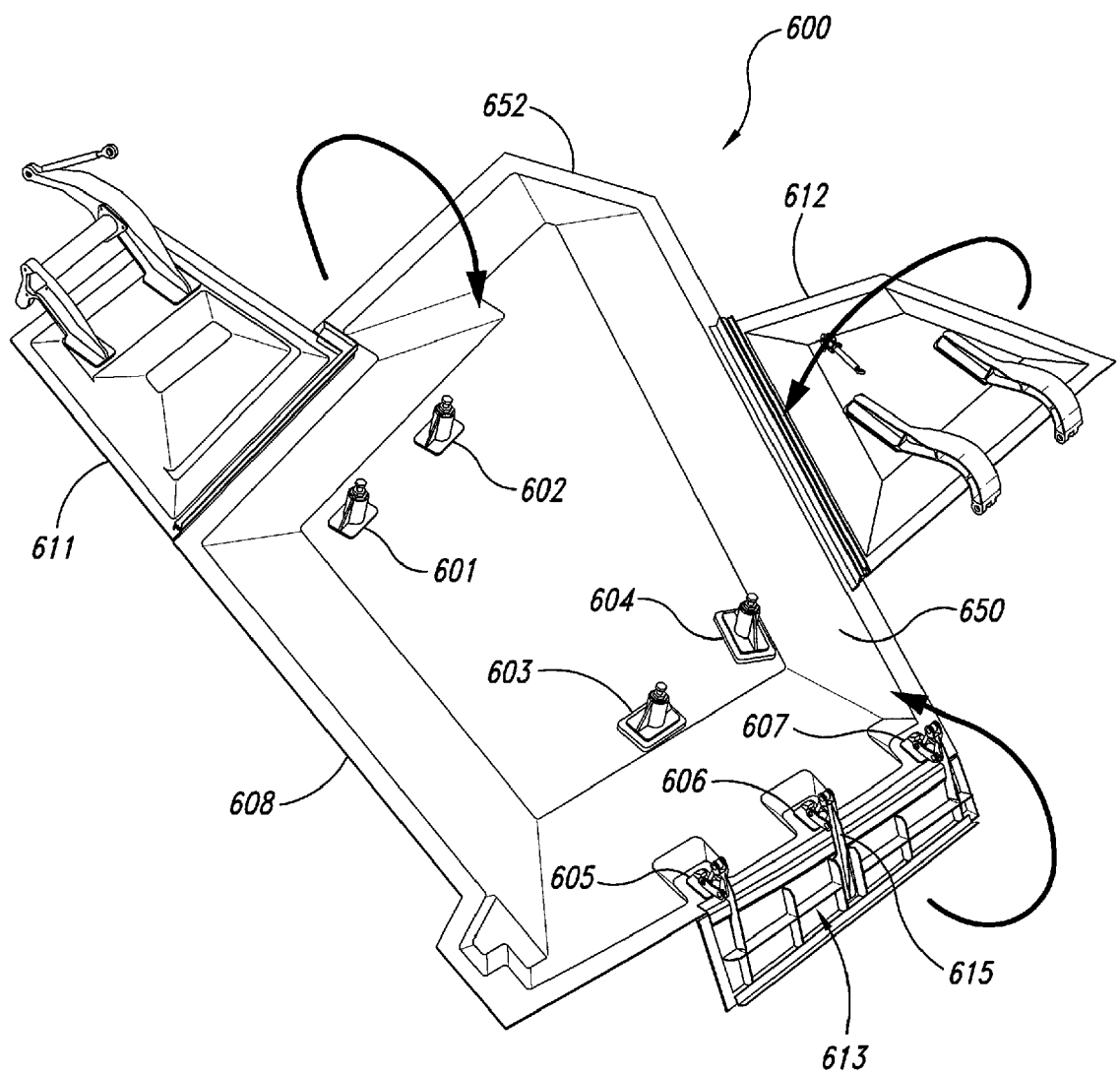
FIG. 6 shows a perspective view illustration of the rigging of FIGS. 2, 3, and 5 in the context of an aircraft wing main landing gear door application.

FIG. 6 illustrates rigging similar to riggings 200, 300, and 500 described according to FIGS. 2, 3, and 5, respectively. For example, rigging 601-604 may be similar in construction and function to rigging 200 in FIG. 2. Also, rigging 605-607 may be similar in construction and function to rigging 300 in FIG. 3 and rigging 500 in FIG. 5. In FIG. 6, rigging 600-607 are illustrated as they may be applied in the context of an aircraft wing MLG door assembly, generally at 600, viewed from a vantage of assembly interior 650. In general, rigging 600-607 may include respective tooling appurtenances (not shown), similar to those shown in FIGS. 1-5, and may configured to allow access to the respective tooling appurtenances from assembly exterior 652. Rigging 601-602 may be used to adjust aircraft strut door assembly 608 into a preselected rigging position relative to trunnion door assembly 611. Rigging 603-604 may be used to adjust aircraft strut door assembly 605 into a preselected rigging position relative to brace door assembly 612. Also, rigging 605-607 may be coupled to adjustable hinge assembly 615, which may be affixed to lower strut door assembly 613, to adjust aircraft strut door assembly 605 into a preselected rigging position relative to lower strut door assembly 613. The external surface of each of door assemblies 611-613 may provide an access port (not shown) for respective rigging 601-607, such that a suitable tool may be introduced therethrough from a respective exterior of assemblies 611-613 manipulate a respective tool appurtenances (not shown) of the respective rigging 601-607. Of course, the presence, number, location, and distribution of rigging 601-607 in FIG. 6 is provided solely for illustrative purpose, and one having ordinary skill in the arts could adapt the teachings herein to another application yet be within the scope of the present invention.

Embodiments described above illustrate but do not limit the invention. It should also be understood that numerous modifications and variations are possible in accordance with the principles of the present invention. Accordingly, the scope of the invention is defined only by the following claims.

I claim:

1. A rigging for moving a panel relative to a substructure, comprising:
 a retaining base attachable to a panel interior; and,
 a slider rod configured to couple to the substructure and adjustably engage the retaining base, wherein
 the slider rod is manipulable from a panel exterior to adjustably engage the panel in a preselected rigging position along a preselected fair axis,
 the retaining base comprises a support hub configured to adjustably engage with the slider rod and a riser having a riser bore extending from the support hub along the preselected fair axis and communicating between the support hub and a panel access port disposed between the panel exterior and the panel interior,
 the slider rod comprises a tool appurtenance captively positioned within the riser bore and manipulable through the panel access port, and
 manipulation of the tool appurtenance actuates the slider rod to adjustably engage with the support hub and move the panel to the preselected rigging relative to the substructure.

2. The rigging of claim 1, wherein the slider rod further comprises:
 a contact element configured to be held in secured contact with the substructure.

3. The rigging of claim 2, wherein the contact element comprises:
 a contact head configured to be held in adjustable secured contact with the substructure, wherein a portion of the slider rod captures a portion of the substructure.

4. The rigging of claim 3, wherein the substructure includes an adjustable hinge assembly and wherein the contact head comprises an adjustable hinge knuckle held in pivoting contact with the adjustable hinge assembly.

5. The rigging of claim 2, wherein the contact element comprises:
 a contact head configured to be held in fixed secured contact with the substructure, wherein a portion of the slider rod captures a portion of the substructure.

6. The rigging of claim 5, wherein the panel is a main landing gear door panel and the substructure is a main landing gear strut, wherein the slider rod adjustably engages the retaining base to bring the main landing gear door panel into a preselected fair position relative to the main landing gear strut.

7. The rigging of claim 1, wherein the slider rod further comprises:
 a contact element configured to be held in releasable contact with the substructure.

8. A method for positioning an aircraft panel relative to an aircraft substructure utilizing the rigging of claim 1, the method comprising:
 attaching the retaining base to an interior surface of the panel;
 coupling the slider rod to the substructure; and,
 manipulating the tool appurtenance of the slider rod through the panel access port such that the slider rod engages the support hub in such a way that the panel moves along the preselected rigging axis and to the preselected rigging position relative to the substructure.

9. The method of claim 8, wherein the preselected rigging axis is a preselected fair axis and the preselected rigging position is a preselected fair position.

10. The method of claim 9, wherein the coupling of the slider rod to the substructure comprises holding the rigging slider rod in contact with the aircraft substructure, wherein the contact includes one of a releasable contact, a fixed secured contact, or an adjustable secured contact.

11. The method of claim 9, further comprising constraining the rigging slider rod in locked engagement with the retaining base to securely maintain the preselected rigging position.

12. The method of claim 9, further comprising adjustably attaching the retaining base to the aircraft panel in a preselected fit position within a preselected rigging plane such that the aircraft panel is moved relative to the aircraft substructure.

* * * * *